(12) United States Patent
Kunisada

(10) Patent No.: US 9,109,661 B2
(45) Date of Patent: Aug. 18, 2015

(54) BELT DETACHMENT PREVENTING JIG

(75) Inventor: Takashi Kunisada, Hyogo (JP)

(73) Assignee: Bando Chemical Industries, Ltd., Hyogo (JP)

( * ) Notice: Subject to any disclaimer, the term of this patent is extended or adjusted under 35 U.S.C. 154(b) by 210 days.

(21) Appl. No.: 13/820,111

(22) PCT Filed: Aug. 31, 2011

(86) PCT No.: PCT/JP2011/004867
§ 371 (c)(1),
(2), (4) Date: Feb. 28, 2013

(87) PCT Pub. No.: WO2012/032738
PCT Pub. Date: Mar. 15, 2012

(65) Prior Publication Data
US 2013/0167344 A1    Jul. 4, 2013

(30) Foreign Application Priority Data
Sep. 8, 2010   (JP) .................................. 2010-201275

(51) Int. Cl.
F16H 7/24    (2006.01)
(52) U.S. Cl.
CPC .............. F16H 7/24 (2013.01); Y10T 29/53709 (2015.01)
(58) Field of Classification Search
None
See application file for complete search history.

(56) References Cited

U.S. PATENT DOCUMENTS

| 4,109,544 | A  | * | 8/1978 | Clark ............................ 474/130 |
| 2005/0255949 | A1 | * | 11/2005 | Dohogne et al. ................ 474/62 |
| 2010/0125995 | A1 | | 5/2010 | Fukatani |

FOREIGN PATENT DOCUMENTS

| CN | 101631968 A | 1/2010 |
| JP | 09-004687 A | 1/1997 |
| JP | H10-259862 A | 9/1998 |
| JP | 2007-120678 A | 5/2007 |
| JP | 4361961 B | 8/2009 |
| JP | 2010-175007 A | 8/2010 |
| WO | 02/36987 A1 | 5/2002 |

OTHER PUBLICATIONS

International Search Report; PCT/JP2011/004867; Nov. 1, 2011.

* cited by examiner

*Primary Examiner* — Joseph J Hail
*Assistant Examiner* — Brian Keller
(74) *Attorney, Agent, or Firm* — Studebaker & Brackett PC

(57) ABSTRACT

A belt detachment preventing jig (J1) is used for wrapping a belt around a crank pulley and a compressor pulley, each having a pulley groove, in a tight belt tension by having the belt fitted to the pulley groove of the crank pulley, with the belt looped over the compressor pulley, to prevent the belt from being detached from a belt-entering side of the compressor pulley. The belt detachment preventing jig (J1) is includes a fitting groove (11a) positioned on an outer side surface of a pulley flange of the compressor pulley, and configured to be slidably fitted to the pulley flange of the pulley, and a notch (10b) configured to be fitted to the pulley flange of the crank pulley and prevent the jig (J1) from being driven into rotation by a rotation movement of the compressor pulley.

10 Claims, 10 Drawing Sheets (a)

(b)

(a)

(b)

(a)

(b)

BELT DETACHMENT PREVENTING JIG

TECHNICAL FIELD

The present disclosure relates to belt detachment preventing jigs, specifically relates to measures for preventing damage of a backside of a belt when the belt is wrapped around a pulley.

BACKGROUND ART

In general, belt drive systems in which a belt is wrapped around a plurality of flange pulleys each having a pulley groove on its outer circumferential surface include a tension applying means, such as an auto tensioner, which applies predetermined tension to the belt looped over all of the pulleys.

To avoid the provision of such a tension applying means, a belt attachment jig has been suggested which is configured to extend a belt in a circumferential direction in attaching the belt to a plurality of pulleys, and allow the belt to pass over the flange of a pulley, thereby attaching the belt to the pulley.

In the case, for example, where the belt is wrapped around two pulleys, the belt attachment jig is used in such a manner that the belt is looped over one of the two pulleys (a first pulley), and in this state, the belt attachment jig is attached to a second pulley. In this attachment state, the belt is wound around the belt attachment jig, and a belt portion located on the rear side of the belt attachment jig in a pulley rotational direction is fitted to the pulley groove of the second pulley, and a belt portion located on the forward side of the belt attachment jig in the pulley rotational direction is pulled laterally toward a near side of the second pulley. Accordingly, the belt attachment jig is sandwiched between the belt and the pulley groove. The phrase "near side" as used in this specification refers to the side closer to an operator who is attaching the belt, and the phrase "back side" refers to the side opposite to the side closer to the operator.

The belt attachment jig in this attachment state is moved forward in the pulley rotational direction by rotating the center bolt of the jig-attached pulley with a wrench, etc., to gradually increase the area of the belt which is fitted to the pulley groove, and make the belt completely wrapped around the jig-attached pulley in the end.

When the belt is wrapped around the pulleys in such a manner as described above, the belt wound around the belt attachment jig passes through a lateral side of the near side of the jig-attached pulley and is led to the first pulley. Thus, if the belt is wrapped around the pulleys by rotating the second pulley, the belt entering to the first pulley may be pulled hard laterally toward the near side of the first pulley due to the tension generated by the wrapping of the belt. This may result in the detachment of the belt from the first pulley. To avoid the detachment of the belt, belt detachment preventing jigs for preventing detachment of the belt have been known.

For example, Patent Document 1 discloses a belt detachment preventing jig including a plate-like detachment preventing member located on a rim side of a pulley flange, an engagement groove formed in the bottom of the detachment preventing member, and a sandwiching portion which protrudes from the bottom of the detachment preventing member so as to extend along the inner surface of a pulley groove, wherein the pulley flange is sandwiched in the engagement groove, and the sandwiching portion is fixed to the jig by being sandwiched between the belt and the pulley groove. Therefore, even if the belt is pulled toward the near side of the pulley, the detachment preventing member prevents the detachment of the belt from the pulley.

CITATION LIST

Patent Document

Patent Document 1: Japanese Patent No. 4361961

SUMMARY OF THE INVENTION

Technical Problem

The belt detachment preventing jig of Patent Document 1 can prevent the belt from being detached from the pulley. However, the belt detachment preventing jig of Patent Document 1 is driven into rotation by the rotation movement of the pulley to which the jig is fixed, and therefore, as the jig rotates, the belt gradually rides on the detachment preventing jig due to a pulling force laterally toward the near side, and due to this ride, the belt may be tilted and turned over on the side surface of the jig-attached pulley. If this happens, a belt portion located near the forward side of the belt attachment jig in the pulley rotational direction may be twisted, and the back surface of the twisted portion may come into hard contact with the flange of the jig-attached pulley. As a result, the back surface of the belt may be damaged by the pulley flange when the belt is wrapped around the pulley.

Further, in the belt detachment preventing jig of Patent Document 1, part of the jig (i.e., the sandwiching portion) is sandwiched between the belt and the pulley groove. Thus, as the belt is wrapped around the pulley, the tension applied to the belt is accordingly increased. This makes the rotational movement of the pulley heavy, and requires significant power to rotate the pulley.

The present disclosure is thus intended to prevent a belt, looped over a pulley in advance, from being detached from the pulley without causing damage to the back surface of the belt in wrapping the belt around a plurality of pulleys, and to reduce power necessary to rotate the pulleys.

Solution to the Problem

To achieve the above objective, a belt detachment preventing jig according to the present disclosure has an improved structure which allows the belt detachment preventing jig to be attached to a flange pulley without having part of the jig sandwiched between the belt and a pulley groove, and which prevents the belt detachment preventing jig from being driven into rotation by a rotation movement of the pulley to which the belt detachment preventing jig is attached.

Specifically, the present disclosure is directed to a belt detachment preventing jig which is used for wrapping a belt around a plurality of pulleys, the plurality of pulleys including at least one flange pulley and each having a pulley groove, in a tight belt tension by having the belt fitted to the pulley groove of one of the plurality of pulleys that is adjacent to the flange pulley, with the belt looped over the flange pulley, to prevent the belt from being detached from a belt-entering side of the flange pulley adjacent to the one of the plurality of pulleys. The belt detachment preventing jig according to the present disclosure includes the following improved structures.

That is, the first aspect of the present disclosure is that the belt detachment preventing jig includes a fitting groove positioned on an outer side surface of a pulley flange of the flange pulley, and configured to be slidably fitted to the pulley flange of the flange pulley, and a rotation preventing means configured to prevent the belt detachment preventing jig from being rotated by a rotation movement of the flange pulley.

The second aspect of the present disclosure is that the belt detachment preventing jig of the first aspect of the present disclosure includes a jig body which is positioned on the outer side surface of the pulley flange of the flange pulley, and which includes the fitting groove and the rotation preventing means, wherein a detachment preventing plate is provided on the jig body at a location close to the belt-entering side of the flange pulley so as to protrude radially outward of the flange pulley.

The third aspect of the present disclosure is that in the belt detachment preventing jig of the first or second aspect of the present disclosure, a rim edge inner surface of the belt detachment preventing jig is located closer to an inner side of the flange pulley than the fitting groove in a direction along a rotational axis of the flange pulley, and forms a surface inclined downward to the pulley groove.

The fourth aspect of the present disclosure is that in the belt detachment preventing jig of the third aspect of the present disclosure, the pulley groove of each of the plurality of pulleys includes a plurality of pulley grooves arranged in parallel, and each of the plurality of pulley grooves is in a V shape having a decreasing width from an open end to a bottom end, and the rim edge inner surface located closer to the inner side of the flange pulley than the fitting groove in the direction along the rotational axis of the flange pulley is positioned between the pulley flange to which the fitting groove is fitted and one of the plurality of pulley grooves that is closest to the pulley flange, and the rim edge inner surface is inclined at an angle equal to an angle of one of side surfaces of the closest pulley groove that is closer to the pulley flange.

The fifth aspect of the present disclosure is that in the belt detachment preventing jig of any one of the first to fourth aspects of the present disclosure, the rotation preventing means is a notch which is located radially outside the flange pulley and which is cut so as to curve inward in a radial direction of the flange pulley and be fitted to a rim edge of the one of the plurality of pulleys.

The sixth aspect of the present disclosure is that in the belt detachment preventing jig of any one of the first to fourth aspects of the present disclosure, the rotation preventing means is a contact member which is located radially outside the flange pulley and of which a side surface comes in contact with a backside of the belt on a belt-separating side of the flange pulley.

The seventh aspect of the present disclosure is that in the belt detachment preventing jig of any one of the first to fourth aspects of the present disclosure, the rotation preventing means is a stop member which is located radially outside the flange pulley and which is stopped by a structure provided beforehand.

The eighth aspect of the present disclosure is that the belt detachment preventing jig of any one of the first to seventh aspects of the present disclosure includes a jig body which is positioned on the outer side surface of the pulley flange of the flange pulley, and which includes the fitting groove and the rotation preventing means, wherein the jig body is in an annular shape around the pulley flange of the flange pulley, part of the jig body located closer to the flange pulley forms a large diameter portion of which an inner diameter is larger than an outer diameter of the pulley flange of the flange pulley, and the other part of the jig body forms a small diameter portion of which an inner diameter is smaller than the outer diameter of the pulley flange of the flange pulley, and a diameter of the fitting groove is larger than a rim edge of the pulley flange of the flange pulley along the entire large diameter portion.

The ninth aspect of the present disclosure is that the belt detachment preventing jig of any one of the first to seventh aspects of the present disclosure includes a jig body which is positioned on the outer side surface of the pulley flange of the flange pulley, and which includes the fitting groove and the rotation preventing means, wherein the jig body is in an arc shape extending along the pulley flange of the flange pulley, the fitting groove extends so as to follow a rim edge of the pulley flange of the flange pulley along the entire jig body, and a length of the fitting groove is equal to or shorter than a half circle of the pulley flange, or a distance between both open ends of the fitting groove is equal to or larger than a diameter of the pulley flange of the flange pulley.

The tenth aspect of the present disclosure is that the belt detachment preventing jig of any one of the first to ninth aspects of the present disclosure further includes a handle.

Advantages of the Invention

According to the first aspect of the present disclosure, the belt detachment preventing jig can be attached to the flange pulley without having part of the jig sandwiched between the belt and the pulley groove, by fitting the fitting groove slidably to the pulley flange. Thus, the tension applied to the belt in wrapping the belt around the pulley is reduced, and the pulley can be rotated with less load, which means that it is possible to reduce power necessary to rotate the pulley. The belt detachment preventing jig in this attachment state is prevented from detaching from the jig-attached pulley radially outward of the pulley along the rotational axis of the pulley, due to the fitting between the fitting groove and the pulley flange. Thus, even if the jig-attached pulley is rotated in wrapping the belt around the pulley, the flange of the pulley slides in the fitting groove, and the rotation preventing means prevents the jig from being driven into rotation by the rotation movement of the pulley. Accordingly, the belt detachment preventing jig is maintained at a predetermined location and in a predetermined position. As a result, the belt is prevented from riding on the belt detachment preventing jig, and therefore, it is possible to prevent the belt from being twisted, and the back side of the belt from coming into hard contact with a rim edge portion of the one of the plurality of pulleys. That is, in wrapping the belt around a plurality of pulleys, it is possible to prevent the belt from being detached from the pulley over which the belt is looped beforehand, without causing damage to the backside of the belt, and possible to reduce power necessary to rotate the pulley.

According to the second aspect of the present disclosure, a detachment preventing plate is provided on the jig body to protrude at a location close to the belt-entering side of the jig-attached pulley. Thus, the detachment preventing plate can reliably prevent the belt from being detached form the pulley. Moreover, since the detachment preventing plate can push the belt toward the one of the plurality of pulleys such that the inner circumferential surface of the belt faces the one of the plurality of pulleys, and maintain this belt position, it is possible to prevent the belt from being twisted due to sliding with the side surface of the pulley in wrapping the belt around the pulley, and possible to prevent damage to the backside of the belt with more reliability.

According to the third aspect of the present disclosure, the rim edge inner surface of the belt detachment preventing jig is located closer to the inner side of the pulley than the fitting groove of the belt detachment preventing jig in the direction along a rotational axis of the pulley, and forms a surface inclined downward to the pulley groove. Thus, it is possible to reduce the load applied to the belt due to contact of the belt detachment preventing jig with the belt fitted to the pulley, compared to the case in which the rim edge inner surface of the belt detachment preventing jig forms a surface parallel to the radial direction of the pulley, or a surface inclined in the opposite direction, that is, a surface inclined downward toward the outside of the pulley in the direction along the rotational axis of the pulley. As a result, it is possible to reduce damage of the belt caused when the belt is wrapped around the pulleys.

According to the fourth aspect of the present disclosure, specific advantages of the third aspect of the present disclosure are obtained. That is, in wrapping a V-ribbed belt around a V-ribbed belt pulley in which a plurality of pulley grooves, each having a V-shaped cross section, are arranged in parallel, it is possible to reduce damage of the V-ribbed belt.

According to the fifth aspect of the present disclosure, the notch of the belt detachment preventing jig which is located radially outside the pulley is fitted to the rim edge of the flange of the one of plurality of pulleys. Thus, the belt detachment preventing jig is stopped by the one of the plurality of pulleys, and is prevented from being driven into rotation by the rotation movement of the jig-attached pulley. As a result, the belt detachment preventing jig according to the present disclosure can be achieved in a minimum and simple configuration.

According to the sixth aspect of the present disclosure, the side surface of the contact member provided at the belt detachment preventing jig comes in contact with the backside of the belt on the belt-separating side of the jig-attached pulley. Thus, it is possible to prevent the belt detachment preventing jig from being driven into rotation by the rotation movement of the jig-attached pulley. As a result, the belt detachment preventing jig according to the present disclosure can be achieved in a simple configuration.

According to the seventh aspect of the present disclosure, the stop member provided at the belt detachment preventing jig is stopped by a structure provided beforehand. Thus, it is possible to prevent the belt detachment preventing jig from being driven into rotation by the rotation movement of the jig-attached pulley. As a result, the belt detachment preventing jig according to the present disclosure can be achieved in a simple configuration.

According to the eighth aspect of the present disclosure, the jig body is in an annular shape, and includes a large diameter portion whose inner diameter is larger than the outer diameter of the pulley flange of the jig-attached pulley, and a small diameter portion whose inner diameter is smaller than the outer diameter of the pulley flange of the jig-attached pulley. Further, a fitting groove is formed along the entire large diameter portion. Thus, the belt detachment preventing jig can be attached to the flange pulley by bringing the belt detachment preventing jig to cover the pulley flange of the flange pulley from a lateral side of the pulley flange in the direction along the pulley rotational axis such that the large diameter portion is located radially outside the pulley flange of the pulley to which the jig is to be attached, and thereafter sliding the jig in the radial direction of the pulley to have part of the pulley flange fitted to the fitting groove. Further, the belt detachment preventing jig attached to the pulley can be removed from the pulley by sliding the jig in the radial direction of the pulley to remove the fitting between the pulley flange and the fitting groove, and thereafter separating the jig from the pulley in the outward direction along the rotational axis of the pulley. The belt detachment preventing jig which can be detached in this manner does not unintentionally come off the jig-attached pulley in the radially outward direction of the pulley. Thus, the detachment of the jig from the pulley during wrapping of the belt around the pulleys can be favorably prevented.

According to the ninth aspect of the present disclosure, the jig body is in an arc shape, and the fitting groove extends so as to follow the rim edge of the flange of the flange pulley along the entire jig body. The length of the fitting groove is equal to or shorter than a half circle of the pulley flange, or the distance between both open ends of the fitting groove is equal to or larger than the diameter of the flange of the flange pulley. Thus, the belt detachment preventing jig can be easily attached to the flange pulley from radially outside the flange pulley.

According to the tenth aspect of the present disclosure, the handle enables easy handling of the belt detachment preventing jig, allowing the belt detachment preventing jig to be easily attached to and detached from the pulley.

DESCRIPTION OF EMBODIMENTS

Embodiments of the present disclosure will be described in detail below based on the drawings. The present disclosure is not limited to the embodiments below.

First Embodiment of Invention

Figure 1:
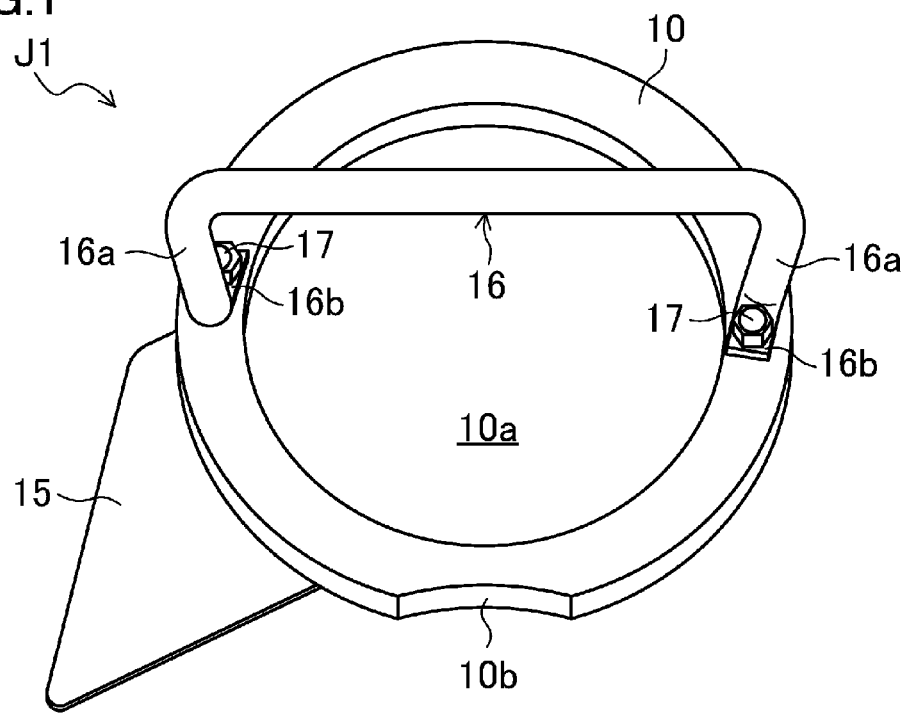
FIG. 1 is an oblique view of a belt detachment preventing jig according to the first embodiment, viewed from the front side.
Figure 2:
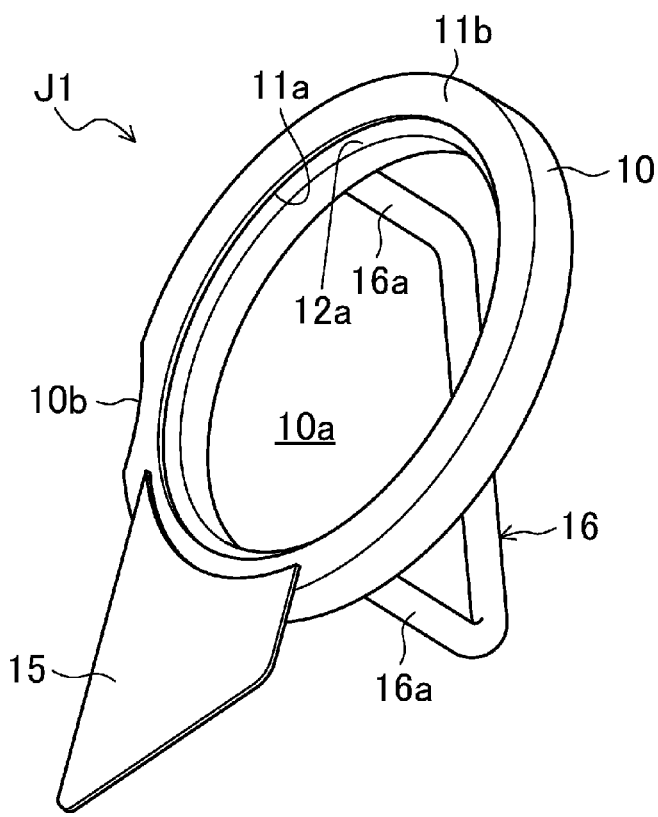
FIG. 2 is an oblique view of the belt detachment preventing jig according to the first embodiment, viewed from the back side.
Figure 3:
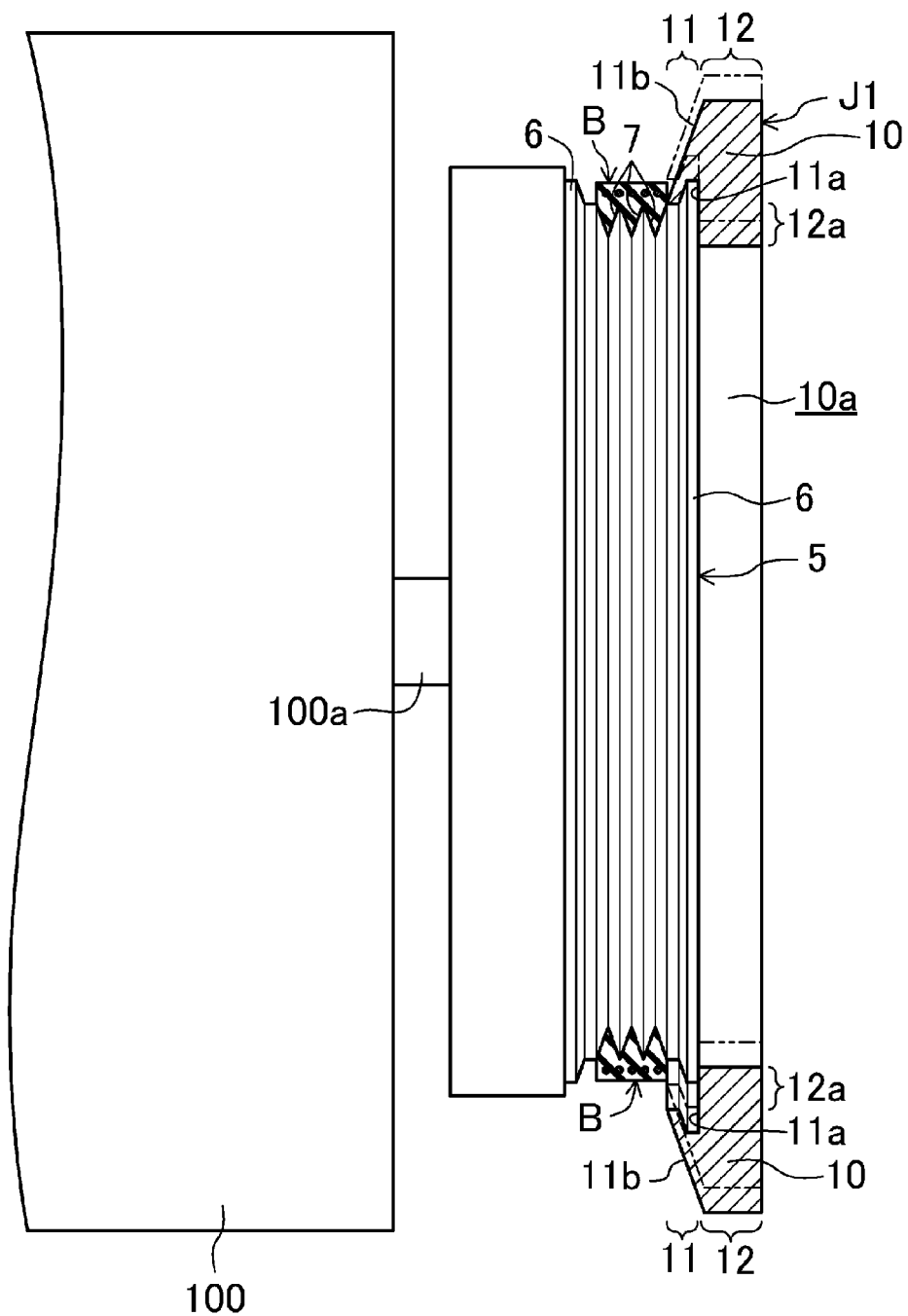
FIG. 3 is a vertical cross-sectional view of the belt detachment preventing jig according to the first embodiment in a state in which the belt detachment preventing jig is attached to a pulley.
Figure 4:
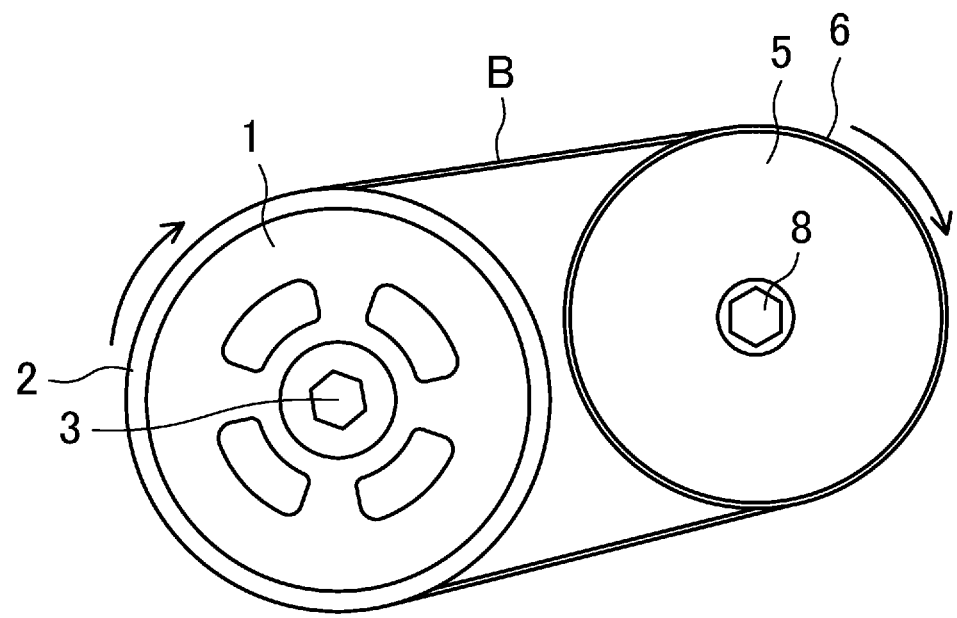
FIG. 4 is a side view showing a crank pulley and a compressor pulley around which a belt is wrapped.

FIG. 1 to FIG. 3 show a belt detachment preventing jig J1 according to the first embodiment. FIG. 1 is an oblique view of the belt detachment preventing jig J1, viewed from the front side. FIG. 2 is an oblique view of the belt detachment preventing jig J1, viewed from the back side. FIG. 3 is a vertical cross-sectional view of the belt detachment preventing jig J1. FIG. 4 is a side view showing two pulleys 1, 5 around which a V-ribbed belt (hereinafter simply referred to as a belt) B is wrapped using the belt detachment preventing jig J1 and a belt attachment jig J2. FIG. 3 also shows a relationship between the belt detachment preventing jig J1 and a pulley 1 to which the belt detachment preventing jig J1 is attached, and omits showing a handle 16.

As shown in FIG. 4, the belt detachment preventing jig J1 according to the present embodiment is used, for example, for wrapping the belt B in a tight belt tension around a crank pulley 1 coupled to a crank shaft of an engine body mounted on an engine, and a compressor pulley 5 coupled to an input axis of an air conditioner compressor also mounted on the engine, together with the belt attachment jig J2 described later.

The belt B has a flat belt-like belt body in which a core wire made of a highly flexible fiber is buried, and a plurality of V-ribs (three V-ribs in the present embodiment) extending in a circumferential direction of the belt are integrally formed in an inner circumferential surface of the belt body. The crank pulley 1 and the compressor pulley 5 are rotatably supported and located close to each other with a predetermined distance between the centers. The distance between the centers of the pulleys cannot be changed. The arrows in FIG. 4 respectively indicate the direction of rotation of the pulleys 1, 5. The engine does not have an auto tensioner (a tension applying means) which applies tension to the belt B.

As shown in FIG. 3, the compressor pulley 5 is a flange pulley having a pair of annular pulley flanges 6 located and protruding at both ends of the outer circumferential surface of the pulley in a direction of a rotational axis of the pulley. A plurality of pulley grooves 7 (three pulley grooves in the present embodiment) are formed in the outer circumferential surface of the compressor pulley 5 between the pair of pulley flanges 6. The pulley grooves 7 are fitted to the V-ribs formed in the inner circumferential surface of the belt B, and extend parallel to one another in the circumferential direction. Each of the pulley grooves 7 is in a V shape having a decreasing width from an open end to a bottom end. The input axis 100a of an air conditioner compressor 100 is inserted in a hub portion of the compressor pulley 5 from the back side of the pulley, and the end portion of the input axis 100a is fixed at a near-side portion of the pulley with a center bolt 8 shown in FIG. 4.

The crank pulley 1 is also a flange pulley having a pair of annular pulley flanges 2 located and protruding at both ends of the outer circumferential surface of the pulley in a direction of a rotational axis of the pulley. Although not shown, a plurality of pulley grooves (three pulley grooves in the present embodiment), which are fitted to the V-ribs formed in the inner circumferential surface of the belt, and each of which has a V-shaped cross-section, are formed in the outer circumferential surface of the crank pulley 1 between the pair of pulley flanges 2, similar to the compressor pulley 5. The crank shaft of an engine is inserted in a hub portion formed in the middle of the diameter of the crank pulley 1 from the back side of the pulley, and the end portion of the crank shaft is fixed at a near-side portion of the pulley with a center bolt 3.

The belt detachment preventing jig J1 is used by being attached to the compressor pulley 5 over which the belt B is looped. The belt detachment preventing jig J1 is made of a metal, and includes an annular jig body 10 having an opening 10a in the center, a detachment preventing plate 15 provided on the back side of the jig body 10 (i.e., on the surface facing inside the pulley in the direction along the rotational axis of the pulley, when the belt attachment preventing jig J1 is used) and protruding radially outward from the jig body, and a handle 16 connected to the front side of the jig body 10 (i.e., connected to the surface facing outside the pulley in the direction along the rotational axis of the pulley, when attached to the pulley) as shown in FIG. 1 and FIG. 2.

As shown in FIG. 3, the outer diameter of the jig body 10 is larger than the outer diameter of the pulley flange 6 of the compressor pulley 5. Part of the jig body 10 located closer to the compressor pulley 5 forms a large diameter portion 11 of which an inner diameter is larger than the outer diameter of the compressor pulley 5, and the other part of the jig body 10 forms a small diameter portion 12 of which an inner diameter is smaller than the outer diameter of the compressor pulley 5. The large diameter portion 11 and the small diameter portion 12 are integrally formed and located next to each other in the direction along which the opening 10a passes through.

The small diameter portion 12 has a contact portion 12a which protrudes more inward in a radial direction of the jig body 10 than the large diameter portion 11. The contact portion 12a comes in contact with the side surface of the pulley flange 6 when the belt detachment preventing jig J1 is attached to the compressor pulley 5.

A fitting groove 11a is recessed radially outward of the jig body 10, in a portion of the large diameter portion 11 that is close to the small diameter portion 12, so as to be slidably fitted to the pulley flange 6 of the compressor pulley 5 from radially outside the pulley. The fitting groove 11a is larger in diameter than the rim edge of the pulley flange 6 of the compressor pulley 5 around the entire large diameter portion 11.

Further, a rim edge inner surface 11b, located closer to the inner side of the pulley in the direction along the rotational axis of the pulley than the fitting groove 11a of the large diameter portion 11, is positioned between the pulley flange 6 to which the fitting groove 11a is fitted and the pulley groove 7 closest to that pulley flange 6. The rim edge inner surface 11b forms a surface inclined downward to the closest pulley groove 7 at an angle equal to an angle of one of side surfaces of the closest pulley groove 7 that is closer to the pulley flange 6 so that the side surface of the closest pulley groove 7 and the inclined surface can be continuous. With this structure, it is possible to reduce the load applied to the belt B due to contact of the belt detachment preventing jig J1 with the belt B fitted in the pulley grooves 7 of the compressor pulley 5, compared to the case in which the rim edge inner surface 11b of the belt detachment preventing jig J1 forms a surface parallel to the radial direction of the pulley, or a surface inclined in the opposite direction, that is, a surface inclined downward toward the outside of the pulley in the direction along the rotational axis of the pulley. As a result, it is possible to reduce damage of the belt B caused when the belt B is wrapped around the pulleys 1, 5.

As shown in FIG. 1 and FIG. 2, the outer circumferential surface of the jig body 10 is provided with a notch 10b as a rotation preventing means. The notch 10b is cut so as to curve inward in the radial direction of the jig body 10, following the shape of the rim edge of the pulley flange 2 of the crank pulley 1, so that the notch 10b can be fitted to the rim edge of the pulley flange 2 of the crank pulley 1. In attaching the belt detachment preventing jig J1 to the compressor pulley 5, the notch 10b is fitted to the rim edge of the pulley flange 2 of the crank pulley 1 to stop and position the belt detachment preventing jig J1 at the crank pulley 1, and prevent the belt detachment preventing jig J1 from being driven into rotation by the rotation movement of the compressor pulley 5. The provision of the notch 10b formed in the outer circumferential surface of the jig body as a rotation preventing means which prevents the belt detachment preventing jig J1 from being driven into rotation by the rotation movement of the compressor pulley 5 to which the belt detachment preventing jig J1 is attached, enables a minimum and simple configuration of the belt detachment preventing jig J1 according to the present disclosure.

In the present embodiment, the notch 10b is cut so as to curve inward in the radial direction of the jig body 10, but is not limited to this shape. The notch 10b may have another shape, such as a V shape or a square U shape, which is notched inward in the radial direction of the jig body 10. It is possible to adopt various shapes which are fitted to the rim edge of the pulley flange 2 of the pulley 1 and capable of preventing the belt detachment preventing jig J1 from being driven into rotation by the rotation movement of the compressor pulley 5.

The detachment preventing plate 15 is welded to a back side portion of the jig body 10 that is located at a belt-entering side of the compressor pulley 5. The detachment preventing plate 15 is in an approximately trapezoidal shape in plan view such that it gradually and significantly expands toward the notch 10b from a position apart from the notch 10b to reliably prevent the belt B from being detached from the compressor pulley 5. Further, since the detachment preventing plate 15 can push the belt B toward the pulley 1 such that the inner circumferential surface of the belt B faces the crank pulley 1, and maintain this belt position, it is also possible to prevent the belt B from being twisted due to sliding with the side surface of the crank pulley 1 in attaching the belt B to the pulleys 1, 5.

The handle 16 is in an arc shape having a pair of legs 16a, and is provided so as to bridge over the opening 10a of the jig body 10. Flat fixing plates 16b provided at the ends of the legs 16a are fixed to the jig body 10 with bolts 17 at opposite locations. The handle 16 enables easy handling of the belt detachment preventing jig J1, allowing the belt detachment preventing jig J1 to be easily attached to and detached from the pulley 5.

Although described later, the belt detachment preventing jig J1 having the above configuration is attached to the compressor pulley 5 by bringing the belt detachment preventing jig J1 to cover the pulley flange 6 of the compressor pulley 5 from a lateral side of the pulley flange 6 and making the side surface of the pulley flange 6 come in contact with the contact portion 12a as shown by the dash-dot-dot line in FIG. 3, and thereafter sliding the belt detachment preventing jig J1 in the radial direction of the pulley to have part of the pulley flange 6 fitted to the fitting groove 11a. The belt detachment preventing jig J1 attached to the compressor pulley 5 in this manner does not come off the compressor pulley 5 in the outward direction along the rotational axis of the pulley, due to the fitting of the pulley flange 6 to the fitting groove 11a, and also does not come off the compressor pulley 5 outward in the radial direction of the pulley. Thus, unintentional detachment from the pulley 5 can be preferably prevented.

Further, the belt detachment preventing jig J1 attached to the compressor pulley 5 can be removed from the pulley 5 by sliding the jig J1 in the radial direction of the pulley to remove the fitting between the pulley flange 6 and the fitting groove 11a, and thereafter separating the jig J1 from the compressor pulley 5 in the outward direction along the rotational axis of the compressor pulley 5.

The belt attachment jig J2 used together with the belt detachment preventing jig J1 is used in such a manner that one end of the belt B is looped over the compressor pulley 5, and in this state, the other end of the belt B is wound around the belt attachment jig J2, thereby attaching the belt attachment jig J2 to the crank pulley 1. The belt attachment jig J2 is configured by bending an approximately cross-shaped, plate-like metal member having four projections as shown in FIG. 5(a) which will be referred to later. One projection forms a holding portion 50 which receives and holds part of the belt B on the outer circumferential surface of the crank pulley 1, and one of the projections on the left or right side of the holding portion 50 forms a guide portion 51 positioned on a lateral side of the crank pulley 1.

To attach the belt attachment jig J2 to the crank pulley 1, the belt B is made to run over the holding portion 50 and hung on the guide portion 51, and is fitted to the pulley groove of the crank pulley 1 on the rear side of the belt attachment jig J2 in the pulley rotational direction. Then, the belt B is pulled laterally toward the near side of the crank pulley 1 on the forward side of the belt attachment jig J2 in the pulley rotational direction, thereby sandwiching the holding portion 50 between the belt B and the outer circumferential surface of the crank pulley 1. While in this attachment state, the belt attachment jig J2 is moved in the pulley rotational direction together with the belt B as the crank pulley 1 rotates, thereby fitting the belt B to the pulley groove of the crank pulley 1.

—Method of Use—

Figure 5:
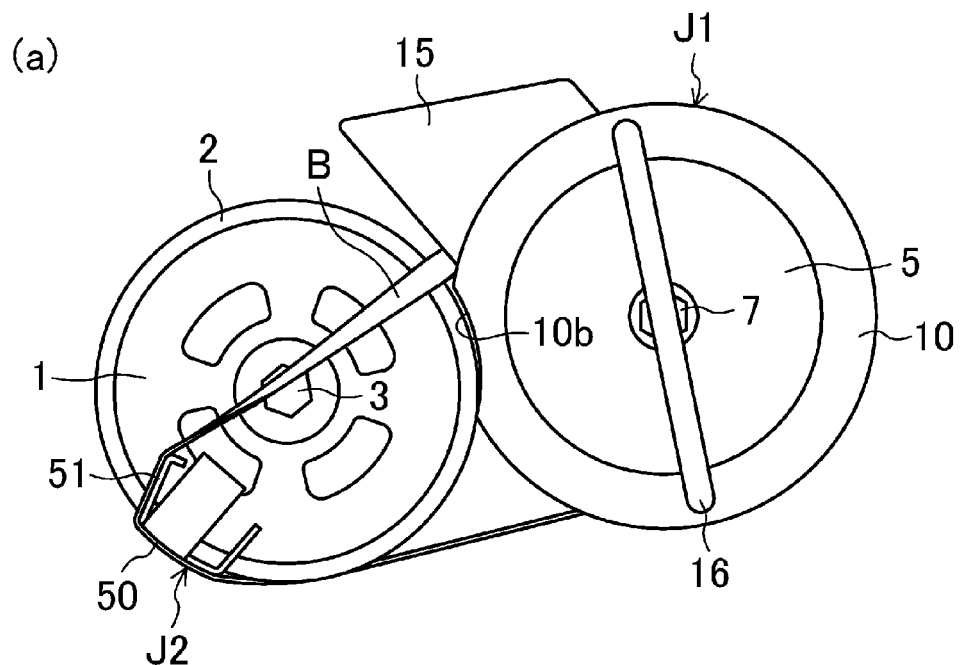
FIG. 5 is a side view showing a first half step of attaching the belt to the pulleys.
Figure 5:
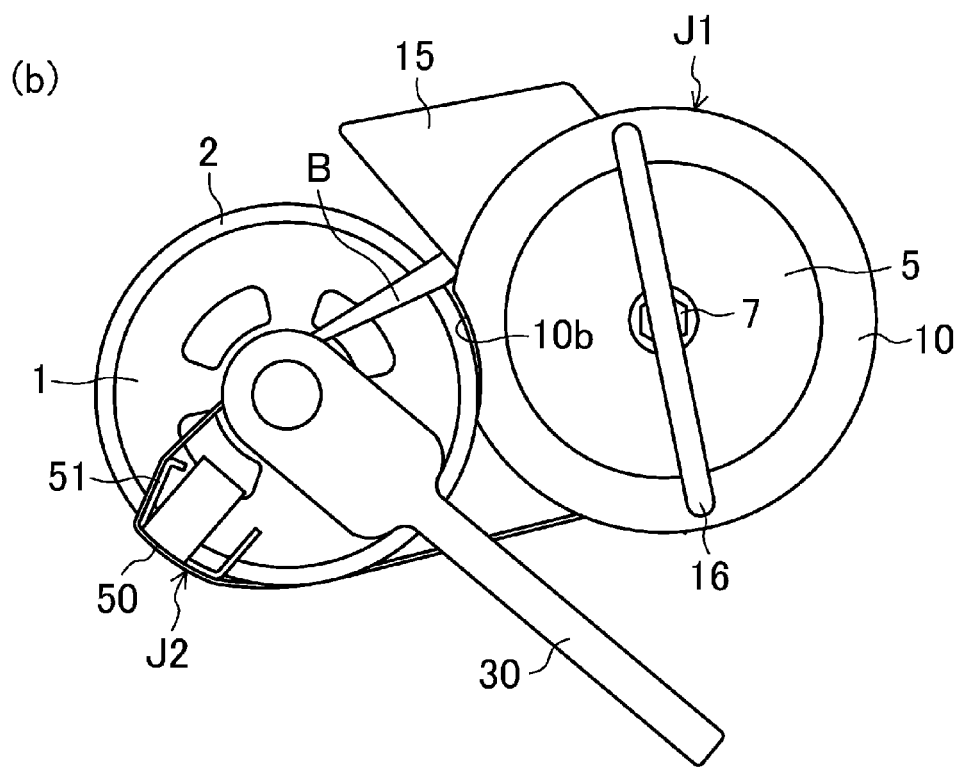
Figure 6:
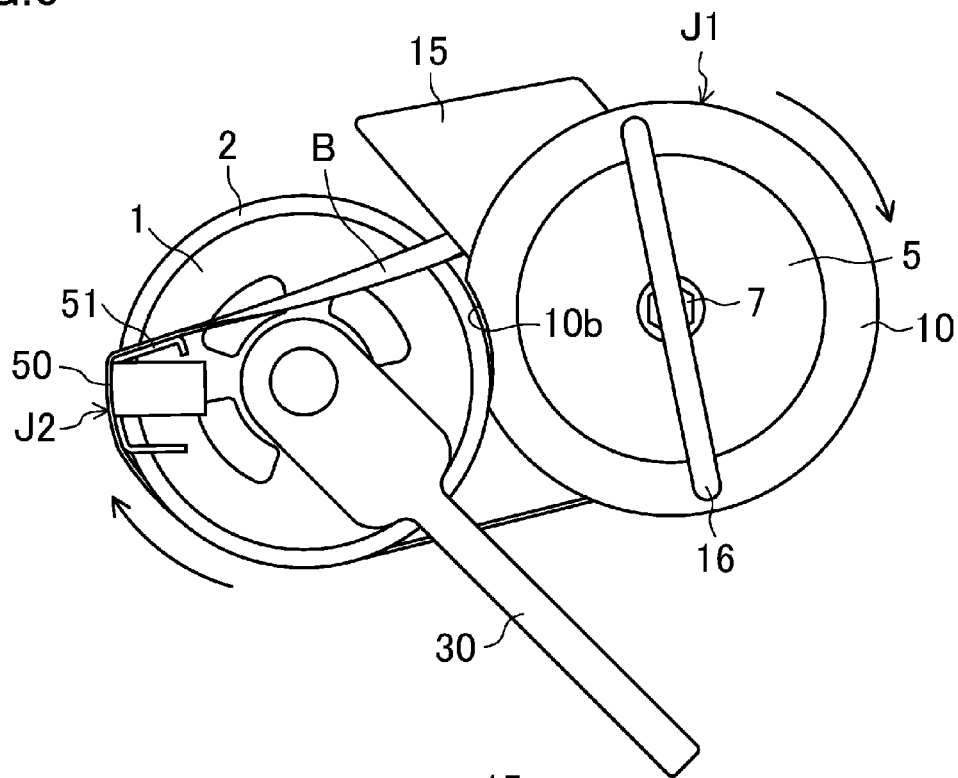
FIG. 6 is a side view of a second half step of attaching the belt to the pulleys.
Figure 6:
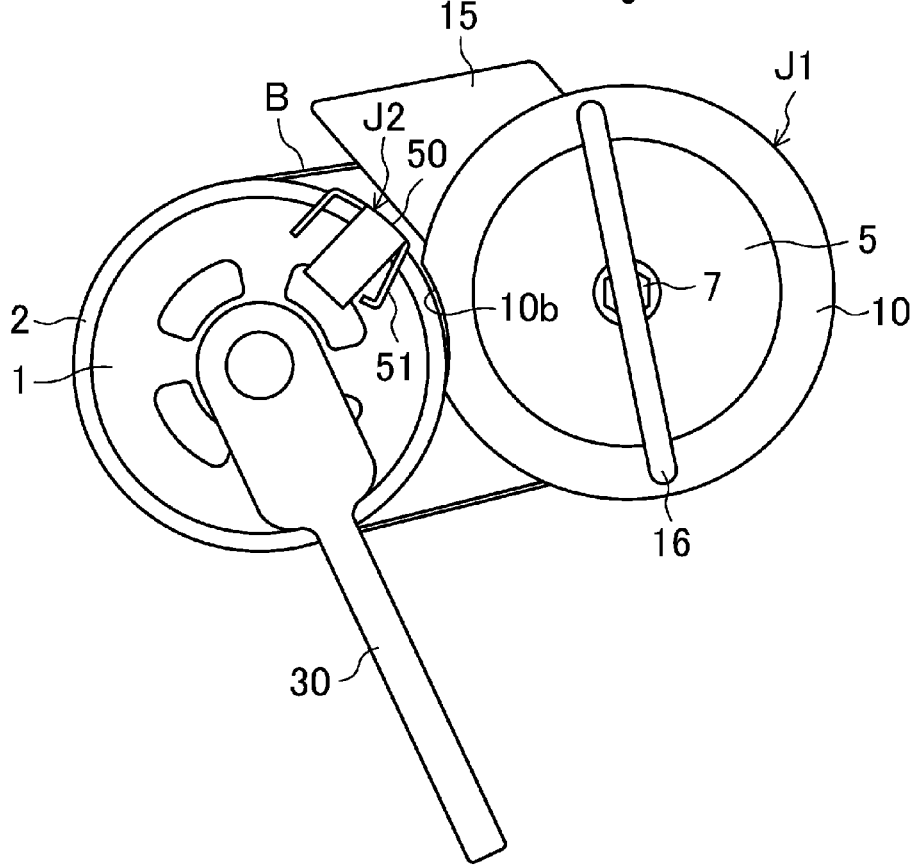

Now, an example method of attaching the belt B to the crank pulley 1 and the compressor pulley 5 using the belt detachment preventing jig J1 and the belt attachment jig J2 will be described with reference to FIG. 5 and FIG. 6. FIG. 5 is a side view showing a first half step of attaching the belt to the crank pulley 1. FIG. 6 is a side view showing a second half step of attaching the belt to the crank pulley 1. The arrows in FIG. 6(a) indicate the directions of rotation of the pulleys 1, 5.

First, one end of the belt B is looped over the compressor pulley 5 as shown in FIG. 5(a). Then, the belt detachment preventing jig J1 is made to cover the pulley flange 6 of the compressor pulley 5 in the direction along the rotational axis of the pulley from a lateral side of the pulley flange 6, such that the notch 10b is fitted to the rim edge of the pulley flange 2 of the crank pulley 1, and such that the large diameter portion 11 is positioned radially outside the pulley flange 6 of the compressor pulley 5. Thereafter, the belt detachment preventing jig J1 is slid in the radial direction of the pulley to have part of the pulley flange 6 fitted to the fitting groove 11a. As a result, the belt detachment preventing jig J1 is attached to the compressor pulley 5. In this state, the detachment preventing plate 15 pushes the belt B such that the inner circumferential surface of the belt B faces the crank pulley 1, and maintains this belt position.

Further, the other end of the belt B is made to run over the holding portion 50 of the belt attachment jig J2 and hung on the guide portion 51. A portion of the belt B located on the rear side of the belt attachment jig J2 in the pulley rotational direction is fitted to the pulley groove of the crank pulley 1, and a portion of the belt B located on the forward side of the belt attachment jig J2 in the pulley rotational direction is pulled laterally toward the near side of the crank pulley 1, thereby sandwiching the holding portion 50 between the belt B and the outer circumferential surface of the crank pulley 1. The belt attachment jig J2 is attached to the crank pulley 1 in this manner.

Then, as shown in FIG. 5(b), a wrench 30 is coupled to the center bolt 3 of the crank pulley 1 to which the belt attachment jig J2 is attached, so that the crank pulley 1 can be rotated by hand.

The crank pulley 1 is rotated clockwise in FIG. 5(b), using the wrench 30. Accordingly, the belt attachment jig J2 moves forward in the pulley rotational direction, gradually increasing the area of the belt B which is fitted to the pulley groove of the crank pulley 1 as shown in FIG. 6(a).

The belt B wound around the belt attachment jig J2 passes through the lateral side of the near side of the crank pulley 1 and is led to the compressor pulley 5. Thus, a tension is applied to the belt B by the wrapping of the belt B. Here, the belt detachment preventing jig J1 is attached to the compressor pulley 5 without having part of the jig J1 sandwiched between the belt B and the pulley grooves 7. Therefore, the tension applied to the belt B is reduced, and the pulley 1 can be rotated with less load, which means that the pulley 1 requires less power to rotate, compared to the case in which the jig is attached to the pulley 5 by having part of the belt detachment preventing jig sandwiched between the belt B and the pulley grooves 7.

Further, the belt B is pulled hard laterally toward the near side at the belt-entering side of the compressor pulley 5 due to the tension applied to the belt B. This pulling force causes the belt B to be detached from the compressor pulley 5 toward the near side, but the belt detachment preventing jig J1 prevents the belt B from being detached from the compressor pulley 5 without causing damage on the backside of the belt B.

Specifically, the belt detachment preventing jig J1 can reliably prevent the belt B from being detached from the compressor pulley 5, and prevent twisting of the belt B caused by wrapping of the belt B around the crank pulley 1, using the detachment preventing plate 15 which protrudes radially outward from the pulley flange 6 on the belt-entering side of the compressor pulley 5. The belt detachment preventing jig J1 receives a force working on the near side of the pulley from the belt B, due to preventing the detachment of the belt from the compressor pulley 5, but does not come off the compressor pulley 5 because the fitting groove 11a is fitted to the pulley flange 6 of the compressor pulley 5. Further, the belt detachment preventing jig J1 is maintained at a predetermined location and in a predetermined position even when the jig-attached compressor pulley 5 is rotated by the wrapping of the belt B around the crank pulley 1 because the pulley flange 6 of the pulley 5 slides in the fitting groove 11a, and because the belt detachment preventing jig J1 is prevented from being driven into rotation by the rotation movement of the pulley 5 due to fitting between the rim edge of the pulley flange 2 of the crank pulley 1 and the notch 10b. Accordingly, the detachment preventing plate 15 is also maintained at a location on the belt-entering side of the compressor pulley 5. Thus, it is possible to reliably prevent the belt B from being detached form the compressor pulley 5, and prevent the twisting of the belt B caused by wrapping of the belt B around the crank pulley 1, until the completion of the wrapping of the belt B around the crank pulley 1. Further, since the belt detachment preventing jig J1 is prevented from being driven into rotation by the rotation of the compressor pulley 5, it is possible to prevent the belt B from riding on the large diameter portion 11 positioned radially outside the pulley flange 6 of the compressor pulley 5, and on the detachment preventing plate 15. As a result, the belt B is prevented from being twisted, and the backside of the belt B is not brought into hard contact with the pulley flange 2 of the crank pulley 1. Thus, it is possible to prevent the backside of the belt B from being damaged.

As the crank pulley 1 rotates, the belt B on the forward side of the belt attachment jig J2 in the pulley rotational direction moves from a location close to the rotation axis of the crank pulley 1 to radially outside the pulley, and gradually approaches the rim edge of the pulley flange 2 of the crank pulley 1, and eventually rides on the holding portion 50 and overpasses the pulley flange 2 and is completely fitted to the pulley grooves 7. By further rotating the crank pulley 1, the belt attachment jig J2 is separated from the belt B as shown in FIG. 6(b). Here, the rotation of the crank pulley 1 is stopped to remove the belt attachment jig J2 from the crank pulley 1, and the belt detachment preventing jig J1 from the compressor pulley 5, thereby finishing the wrapping the belt B around the crank pulley 1.

In this manner, the belt B can be wrapped around the crank pulley 1 and the compressor pulley 5 in a tight belt tension.

Advantages of First Embodiment

In the first embodiment, the belt detachment preventing jig J1 can be attached to the compressor pulley 5 without having part of the jig J1 sandwiched between the belt B and the pulley grooves 7 by fitting the fitting groove 11a to the pulley flange 6 of the compressor pulley 5. Thus, it is possible to reduce the power necessary to rotate the pulley 1 in wrapping the belt B around the pulleys 1, 5. Further, the belt detachment preventing jig J1 is prevented from being driven into rotation by the rotation of the compressor pulley 5 because the notch 10b is fitted to the pulley flange 2 of the crank pulley 1. Thus, it is possible to maintain the belt detachment preventing jig J1 at a predetermined location and in a predetermined position, and possible to prevent the belt B from overriding the large diameter portion 11 and the detachment preventing plate 15. Further, the detachment preventing plate 15 can reliably prevent the belt B from detaching from the compressor pulley 5, and being twisted due to the wrapping of the belt B around the crank pulley 1. Thus, in wrapping the belt B around the pair of pulleys 1, 5, it is possible to prevent the belt B from being detached from the compressor pulley 5 over which the belt B is looped beforehand, without causing damage on the backside of the belt B, and possible to reduce the power necessary to rotate the pulley 1.

Second Embodiment of Invention

Figure 7:
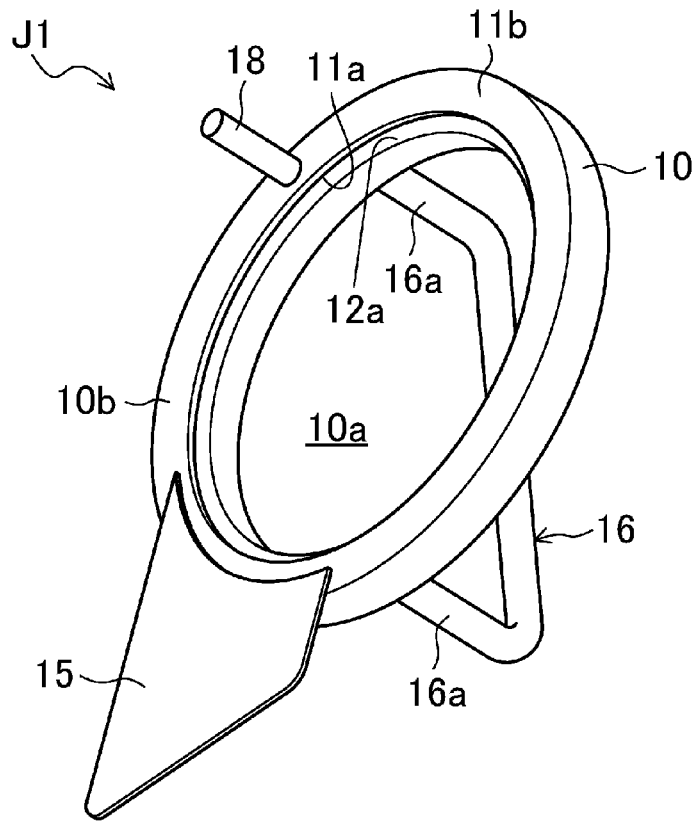
FIG. 7 is an oblique view of a belt detachment preventing jig according to the second embodiment, viewed from the back side.
Figure 8:
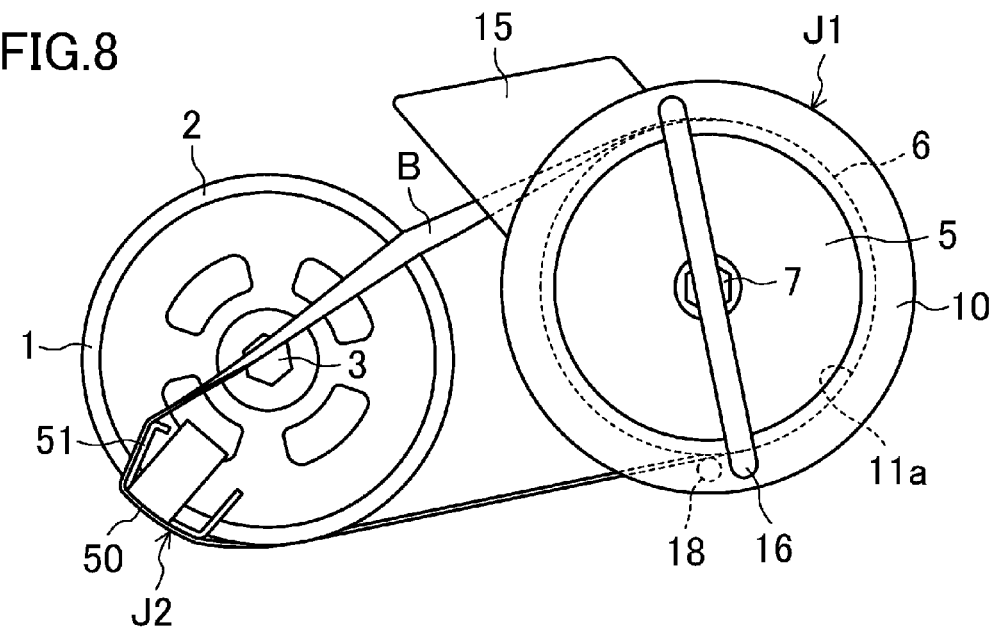
FIG. 8 is a side view showing a state in which a belt is attached to pulleys using the belt detachment preventing jig according to the second embodiment.

FIG. 7 is an oblique view of a belt detachment preventing jig J1 according to the second embodiment, viewed from the back side. FIG. 8 is a side view showing a state in which a belt B is attached to pulleys 1, 5 using the belt detachment preventing jig J1. Configurations in the present embodiment and the third embodiment described later are similar to the configuration in the first embodiment, except the configuration of the rotation preventing means. Thus, only the rotation preventing means having a different configuration will be described. Descriptions of the same configurations were made in the first embodiment based on FIG. 1 to FIG. 6, and a detailed description of the same configurations is omitted in the present embodiment and the third embodiment.

In the first embodiment, the notch 10b configured to be fitted to the rim edge of the pulley flange 2 of the crank pulley 1 is used as a rotation preventing means, but in the present embodiment, the notch 10b is replaced with a columnar contact pin 18 which is a contact member provided on the back surface of the jig body 10 as shown in FIG. 7 as a rotation preventing means.

The contact pin 18 is positioned on a belt-separating side of the compressor pulley 5 at a location radially outside the pulley, and as shown in FIG. 8, the side surface of the contact pin 18 comes in contact with the back surface of the belt B when the belt B is wrapped around the pulleys 1, 5 using the belt detachment preventing jig J1. With this configuration, the belt detachment preventing jig J1 is prevented from being driven into rotation by the rotation movement of the compressor pulley 5 to which the jig J1 is attached.

Advantages of Second Embodiment

Accordingly, in the second embodiment, as well, the belt detachment preventing jig J1 according to the present disclosure can be achieved in a simple configuration. Moreover, the belt detachment preventing jig J1 includes a rotation preventing means in which the contact pin 18 comes in contact with the back surface of the belt B to prevent the belt detachment preventing jig J1 from being driven into rotation. Thus, the belt detachment preventing jig J1 can be advantageously used even if the crank pulley 1 and the compressor pulley 5 are relatively apart from each other, and similar effects as in the first embodiment can be obtained.

Third Embodiment of Invention

Figure 9:
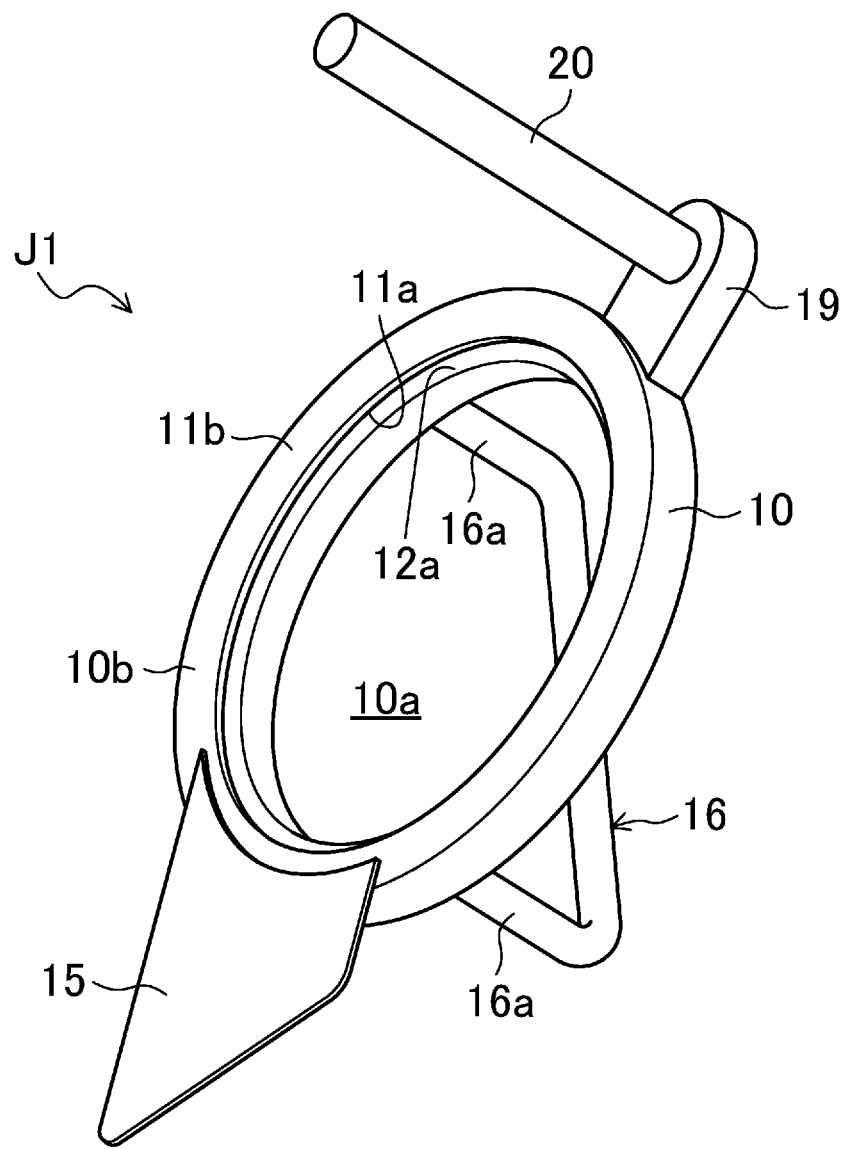
FIG. 9 is an oblique view of a belt detachment preventing jig according to the third embodiment, viewed from the back side.
Figure 10:
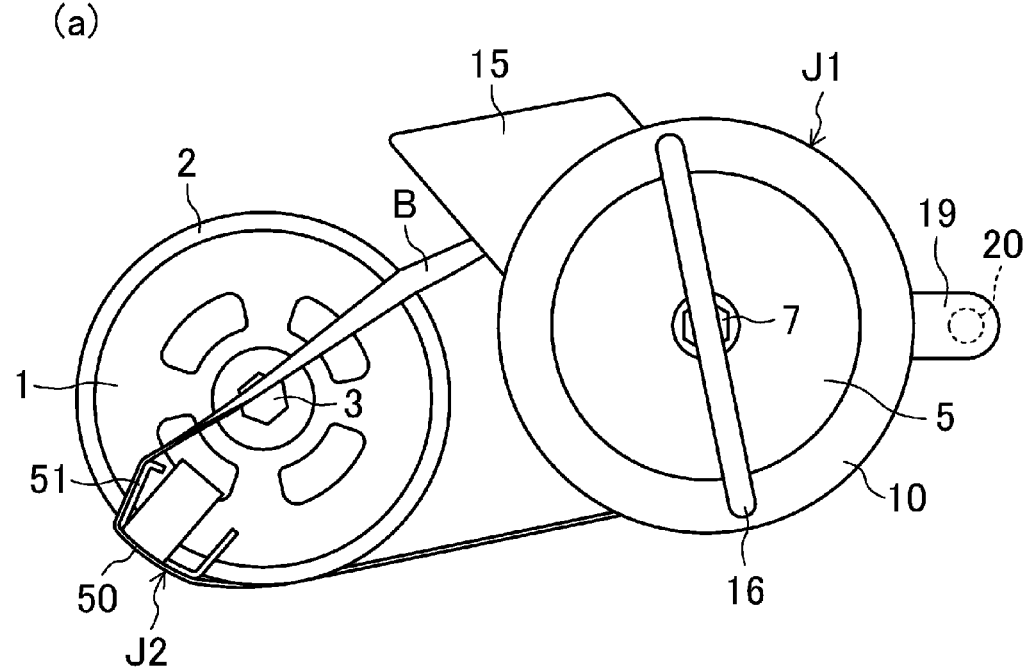
FIG. 10(a) is a side view of the belt detachment preventing jig according to the third embodiment which is attached to the pulley.
FIG. 10(b) is a vertical cross-sectional view of the belt detachment preventing jig according to the third embodiment in a state in which the belt detachment preventing jig is attached to the pulley, and corresponds to FIG. 3.
Figure 10:
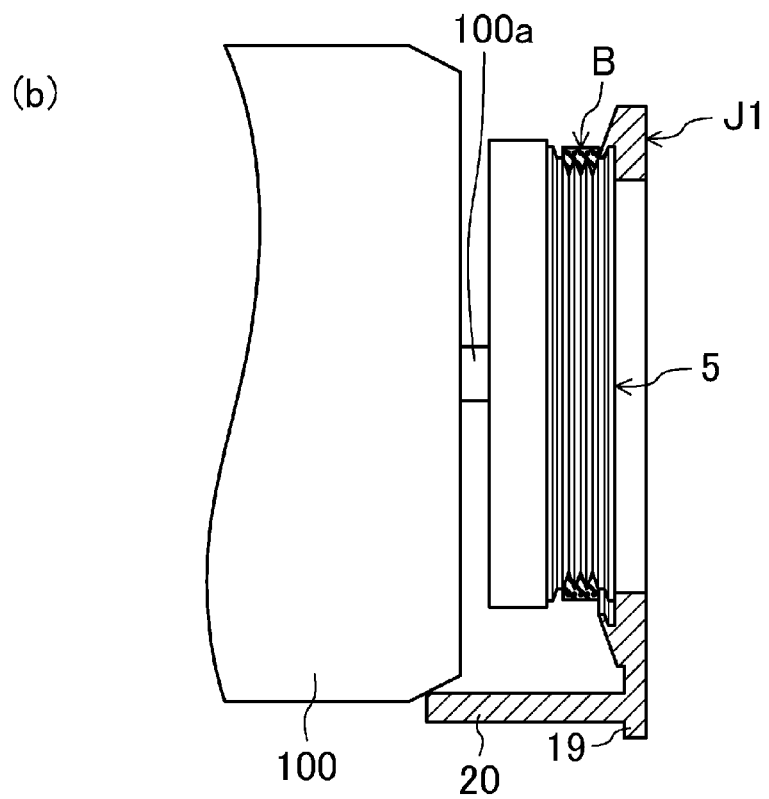

FIG. 9 is an oblique view of a belt detachment preventing jig J1 according to the third embodiment, viewed from the back side. FIG. 10 is a side view showing a state in which a belt B is attached to the pulleys 1, 5 using the belt detachment preventing jig J1.

In the belt detachment preventing jig J1 of the present embodiment, the jig body 10 is provided with a projecting portion 19 which protrudes radially outward, and a columnar stop pin 20, which is a stop member provided as a replacement of the notch 10b of the first embodiment, is provided on the back surface of the projecting portion 19 as a rotation preventing means, as shown in FIG. 9 and FIG. 10(a).

The stop pin 20 is longer than the width of the compressor pulley 5. As shown in FIG. 10(b), the stop pin 20 comes in contact with and stops at the air conditioner compressor 100, which is a structure positioned beforehand on the back side, when the belt B is wrapped around the pulleys 1, 5 using the belt detachment preventing jig J1. With this configuration, the belt detachment preventing jig J1 is prevented from being driven into rotation by the rotation movement of the compressor pulley 5 to which the jig J1 is attached.

Advantages of Third Embodiment

Accordingly, in the third embodiment, as well, the belt detachment preventing jig J1 according to the present disclosure can be achieved in a simple configuration. Moreover, the belt detachment preventing jig J1 includes a rotation preventing means in which the stop pin 20 is stopped at the air conditioner compressor 100 to prevent the belt detachment preventing jig J1 from being driven into rotation by the rotation of the compressor pulley 5. Thus, the belt detachment preventing jig J1 can be advantageously used even if the crank pulley 1 and the compressor pulley 5 are relatively apart from each other, and similar effects as in the first embodiment can be obtained.

Fourth Embodiment of Invention

Figure 11:
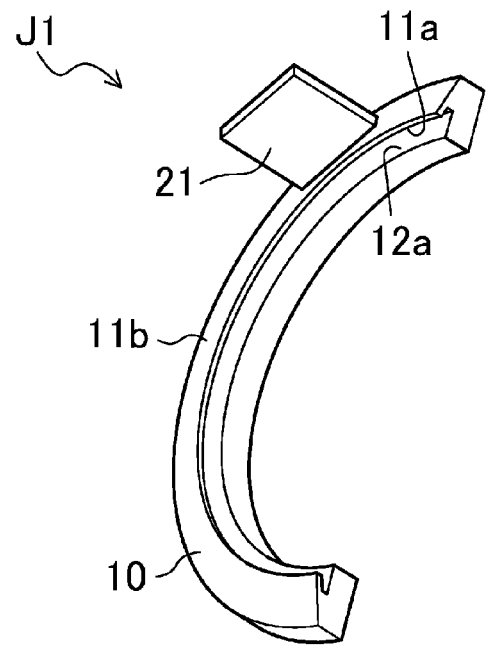
FIG. 11 is an oblique view of a belt detachment preventing jig according to the fourth embodiment, viewed from the back side.
Figure 12:
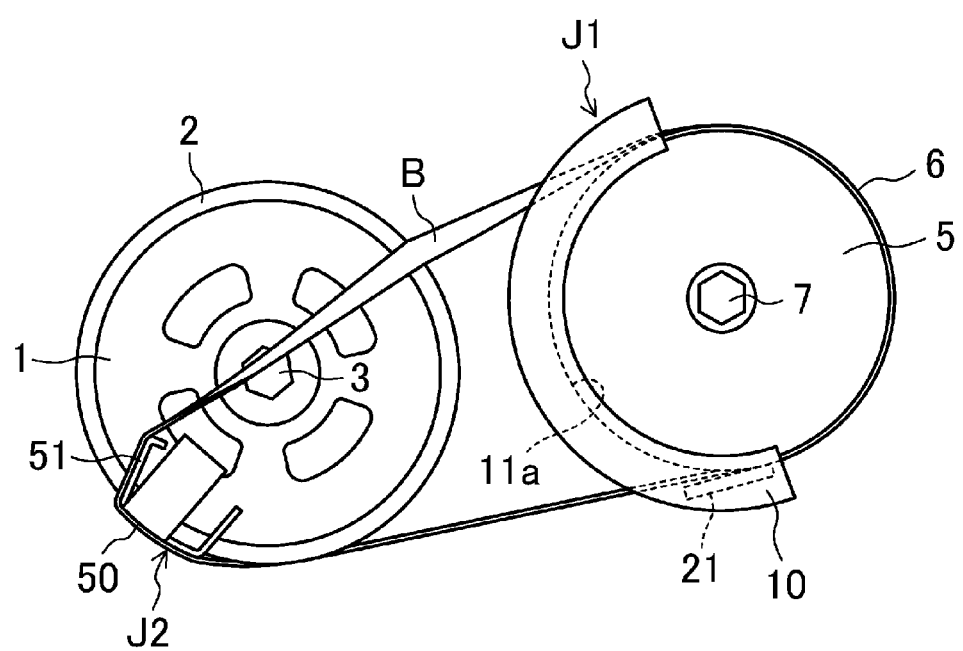
FIG. 12 is a side view showing a state in which a belt is attached to pulleys using the belt detachment preventing jig according to the fourth embodiment.

FIG. 11 is an oblique view of a belt detachment preventing jig J1 according to the fourth embodiment, viewed from the back side. FIG. 12 is a side view showing a state in which a belt B is attached to the pulleys 1, 5 using the belt detachment preventing jig J1. In the present embodiment, as well, configurations identical with or corresponding to the configurations of the first embodiment are labeled with the same reference characters as shown in FIG. 1 to FIG. 6, and a detailed explanation thereof is omitted.

The belt detachment preventing jig J1 of the present embodiment does not include the detachment preventing plate 15 and the handle 16. The shape of the jig body 10 and the rotation preventing means are different from those in the first embodiment.

As shown in FIG. 11, the jig body 10 is in a shape of a half arc extending along a half circle of the pulley flange 6 of the compressor pulley 5. The inner diameter of a back side portion which corresponds to the large diameter portion 11 is smaller than the outer diameter of the pulley flange 6, except the portion where the fitting groove 11a is formed. The inner diameter of a front side portion which corresponds to the small diameter portion 12 is even smaller than the inner diameter of the back side portion, and includes a contact portion 12a, similar to the jig body 10 of the first embodiment. The fitting groove 11a extends so as to follow the half circle of the pulley flange 6 of the compressor pulley 5 along the entire length of the back side portion, and the entire fitting groove 11a is fitted to the pulley flange 6 with no space between each other.

A plate-like contact plate 21, which is a contact member, is provided on and protrudes from the back surface of the jig body 10. The contact plate 21 corresponds to the contact pin 18 of the second embodiment. The contact plate 21 is positioned on the belt-separating side of the compressor pulley 5 at a location radially outside the pulley, and as shown in FIG. 12, the side surface of the contact plate 21 comes in contact with the back surface of the belt B when the belt B is wrapped around the pulleys 1, 5 using the belt detachment preventing jig J1. With this configuration, the belt detachment preventing jig J1 is prevented from being driven into rotation by the rotation movement of the compressor pulley 5 to which the jig J1 is attached.

The belt detachment preventing jig J1 does not include the detachment preventing plate 15. However, part of the jig body 10 which is positioned radially outside the pulley flange 6 of the compressor pulley 5 can prevent the belt B from being detached from the compressor pulley 5 when the belt B is wrapped around the pulleys 1, 5.

Advantages of Fourth Embodiment

Accordingly, in the fourth embodiment, as well, the belt detachment preventing jig J1 according to the present disclosure can be achieved in a simple configuration. Moreover, the belt detachment preventing jig J1 includes a rotation preventing means in which the contact plate 21 comes in contact with the back surface of the belt B to prevent the belt detachment preventing jig J1 from being driven into rotation. Thus, the belt detachment preventing jig J1 can be advantageously used even if the crank pulley 1 and the compressor pulley 5 are relatively apart from each other, and similar effects as in the first embodiment can be obtained.

Further, the belt detachment preventing jig J1 of the fourth embodiment has a simple structure without the detachment preventing plate 15 and the handle 16, and thus can be fabricated at low cost. Further, since the belt detachment preventing jig J1 is configured such that the jig body 10 is in a shape of a half arc having the fitting groove 11a extending so as to follow the half circle of the rim edge of the pulley flange 6 of the compressor pulley 5, the belt detachment preventing jig J1 can be easily attached to the compressor pulley 5 from radially outside the compressor pulley 5.

Variation of Fourth Embodiment

Figure 13:
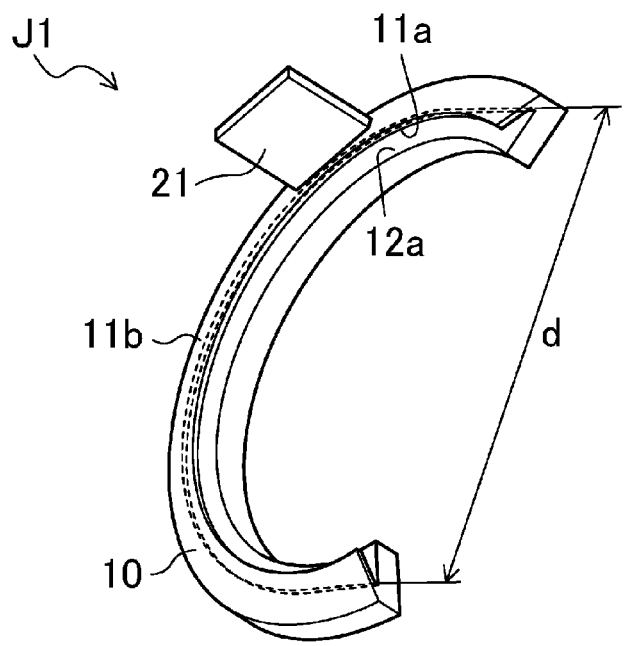
FIG. 13 is an oblique view of a belt detachment preventing jig according to the a variation of the fourth embodiment, viewed from the back side.
Figure 14:
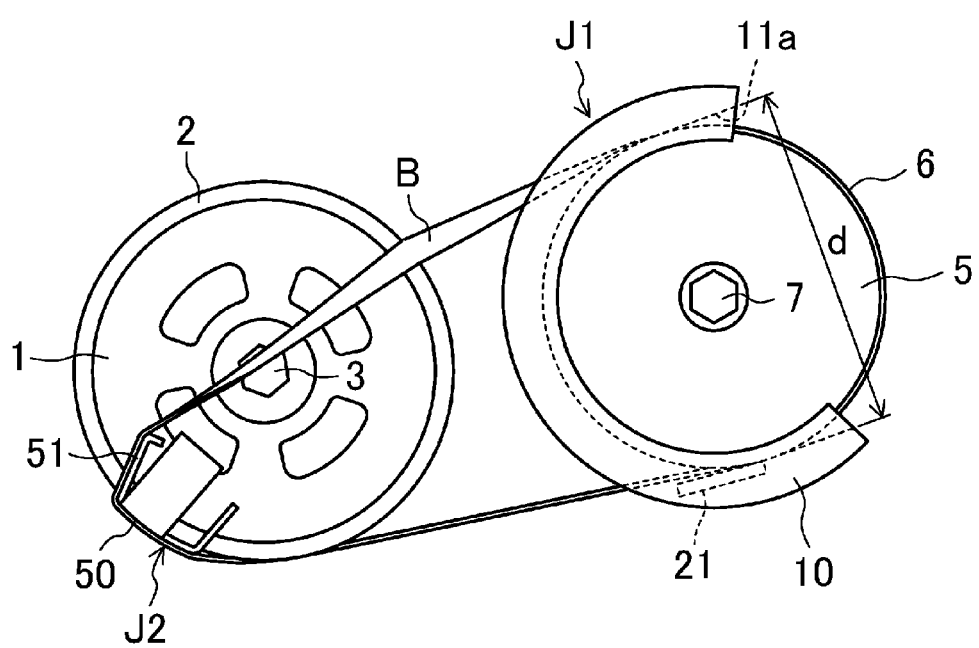
FIG. 14 is a side view showing a state in which a belt is attached to pulleys using the belt detachment preventing jig according to the variation of the fourth embodiment.

FIG. 13 is an oblique view of a belt detachment preventing jig J1 according to a variation of the fourth embodiment, viewed from the back side. FIG. 14 is a side view showing a state in which a belt B is attached to the pulleys 1, 5 using the belt detachment preventing jig J1.

In the fourth embodiment, the jig body 10 is configured to be in a half-arc shape, but in the present variation, a jig body 10 is configured to be in an arc shape (a major arc) extending along more than half the pulley flange 6 of the compressor pulley 5 as shown in FIG. 13. The fitting groove 11a is formed along the entire length of the jig body 10, and the distance d between bottom portions of the both open ends of the fitting groove 11a is equal to or larger than the diameter of the pulley flange 6 of the compressor pulley 5. The distance d is fixed at the both open end portions, and the depth of the fitting groove 11a is gradually increased with an increase in distance from a middle portion to the open ends.

In this variation, as well, the distance d between the bottom portions of the both open ends of the fitting groove 11a is larger than the diameter of the pulley flange 6 of the compressor pulley 5. Thus, as shown in FIG. 14, the belt detachment preventing jig J1 can be easily attached to the compressor pulley 5 from radially outside the compressor pulley 5. Similar effects as in the first embodiment can be obtained as to the other components as well.

The foregoing embodiments are preferred examples, and a technical scope of the present disclosure is not limited to the scope of the above embodiments. It is understood by a person skilled in the art that the above embodiments are examples, that there may be more variations in the combination of the structural elements and the processes, and that such variations are also within the scope of the present disclosure.

For example, in the first to third embodiments, the configurations which include the detachment preventing plate 15 and the handle 16 were described. However, one of the detachment preventing plate 15 or the handle 16, or both of them do not have to be provided. In the case where the detachment preventing plate 15 is not provided, part of the jig body 10 (i.e., the large diameter portion 11) which is positioned radially outside the pulley flange 6 of the compressor pulley 5 can prevent the belt B from being detached from the compressor pulley 5, as in the fourth embodiment.

In the fourth embodiment, the configuration without the detachment preventing plate 15 and the handle 16 was described. However, the configuration is not limited to this configuration, and one of the detachment preventing plate 15 or the handle 16, or both of them may be provided.

In the fourth embodiment, the jig body 10 is in a shape of a half arc, and an example configuration in which the jig body 10 is in a shape of a major arc is described as a variation of the fourth embodiment. However, the present disclosure is not limited to these configurations, and the jig body 10 may be configured to be in an arc shape (a minor arc) extending along less than half the pulley flange 6 of the compressor pulley 5. Further, in the case where the jig body 10 is configured to be in a major arc shape, the distance d between the bottom portions of the both open ends of the fitting groove 11a can be smaller than the diameter of the pulley flange 6 of the compressor pulley 5 if the jig body 10 has the large diameter portion 11. In this case, similar to the first embodiment, the belt detachment preventing jig J1 can be attached to the compressor pulley 5 by bringing the belt detachment preventing jig J1 to cover the pulley flange 6 of the compressor pulley 5 from a lateral side of the pulley flange 6 and making the side surface of the pulley flange 6 come in contact with the contact portion 12a, and thereafter sliding the belt detachment preventing jig J1 in the radial direction of the pulley to have part of the pulley flange 6 fitted to the fitting groove 11a. As a result, unintentional detachment of the belt detachment preventing jig J1 from the pulley 5 can be preferably prevented.

In the third embodiment, the stop pin 20 comes in contact with and stops at the air conditioner compressor 100, but the stop pin 20 is not limited to this configuration. The stop pin 20 may be stopped at a structure provided in advance, such as an engine, etc., thereby preventing the belt detachment preventing jig J1 from being driven into rotation by the rotation movement of the compressor pulley 5 to which the jig J1 is attached.

In the first to fourth embodiments, an example in which the belt B is wrapped around two pulleys, i.e., the crank pulley 1 and the compressor pulley 5 is described, but of course, the belt detachment preventing jig J1 according to the present disclosure may also be used for wrapping the belt B around three or more pulleys in the tight belt tension.

The crank pulley 1 does not have to be a flange pulley. The belt detachment preventing jig J1 according to the present disclosure is applicable if, among a plurality of pulleys to which the belt B is attached using the jig J1, at least the pulley to which the jig J1 is attached is a flange pulley.

In the first to fourth embodiments, a V-ribbed belt B is described as an example belt wrapped around the pulleys 1, 5. However, the belt to which the belt detachment preventing jig J1 of the present disclosure is applicable is not limited to the V-ribbed belt B, but may also be a belt, such as a flat belt and a V belt, other than the V-ribbed belt.

INDUSTRIAL APPLICABILITY

As described above, the present disclosure is useful as a belt detachment preventing jig, and especially suitable as a belt detachment preventing jig in which it is requested to prevent a belt looped over a pulley in advance from being detached from the pulley, without causing damage to the backside of the belt in wrapping the belt around a plurality of pulleys, and to reduce power necessary to rotate the pulleys.

DESCRIPTION OF REFERENCE CHARACTERS

B V-ribbed belt
J1 belt detachment preventing jig
1 crank pulley
5 compressor pulley
2, 6 pulley flange
7 pulley groove
10 jig body
10b notch (rotation preventing means)
11 large diameter portion
11a fitting groove
11b inner surface
12 small diameter portion
15 detachment preventing plate
16 handle
18 contact pin (contact member)
20 stop pin (stop member)
21 contact plate (contact member)

The invention claimed is:

1. A belt detachment preventing jig which is associated with a flange pulley having a pair of pulley flanges on its outer peripheral surface, to prevent a belt from being detached from the flange pulley, comprising:
    an annular or arc shaped jig body extending along one of the pulley flanges and having, in an inner side surface thereof, a fitting groove configured to be slidably fitted to the pulley flange, and
    means for preventing rotation of the jig body together with the flange pulley by a rotation movement of the flange pulley.

2. The belt detachment preventing jig of claim 1,
    wherein the jig body has a detachment preventing plate which protrudes radially outward of the flange pulley and prevents the belt from being detached from a belt-receiving side of the flange pulley.

3. The belt detachment preventing jig of claim 1, further comprising a side surface of an outer peripheral portion of the jig body, the side surface being positioned between the pair of pulley flanges and facing the belt, and including an inclined surface inclined downward to a radially inner side of the flange pulley.

4. The belt detachment preventing jig of claim 3, wherein a plurality of pulley grooves, each having a V-shaped cross section are formed parallel to each other in the outer peripheral surface of the flange pulley,
    the fitting groove on the jig body is aligned with one of the pulley grooves which is closest to the pulley flange to which the jig body is attached, and
    the inclined surface is inclined at a same angle as an angle of one of surfaces of the pulley groove closest to the pulley flange, the one surface being closer to the jig body than the other surface of the pulley groove closest to the pulley flange.

5. The belt detachment preventing jig of claim 1, wherein the rotation preventing means is a notch formed at a portion of the jig body radially outside the flange pulley, and the notch is fitted to a rim edge of the pulley which is arranged next to the flange pulley about which the belt is wound.

6. The belt detachment preventing jig of claim 1, wherein the rotation preventing means is a contact member which is formed at a portion of the jig body radially outside the flange pulley and of which a side surface comes in contact with a backside of the belt on a belt-separating side of the flange pulley.

7. The belt detachment preventing jig of claim 1, wherein the rotation preventing means is a stop member which is formed at a portion of the jig body radially outside the flange pulley and which is stopped by a peripheral structure of the flange pulley.

8. The belt detachment preventing jig of claim 1,
    wherein
    the jig body is in an annular shape,
    and includes a large diameter portion of which an inner diameter is larger than an outer diameter of the pulley flange, and a small diameter portion smaller than the outer diameter of the pulley flange, and
    the fitting groove is formed along an entire longitudinal dimension of the large diameter portion.

9. The belt detachment preventing jig of claim 1,
    wherein
    the jig body is in an arc shape,
    the fitting groove is formed along an entire longitudinal dimension of the jig body, and
    a length of the fitting groove is equal to or shorter than a half circle of the pulley flange, or a distance between both open ends of the fitting groove is equal to or larger than a diameter of the pulley flange.

10. The belt detachment preventing jig of claim 1, further comprising a handle.

* * * * *